Patented May 11, 1948

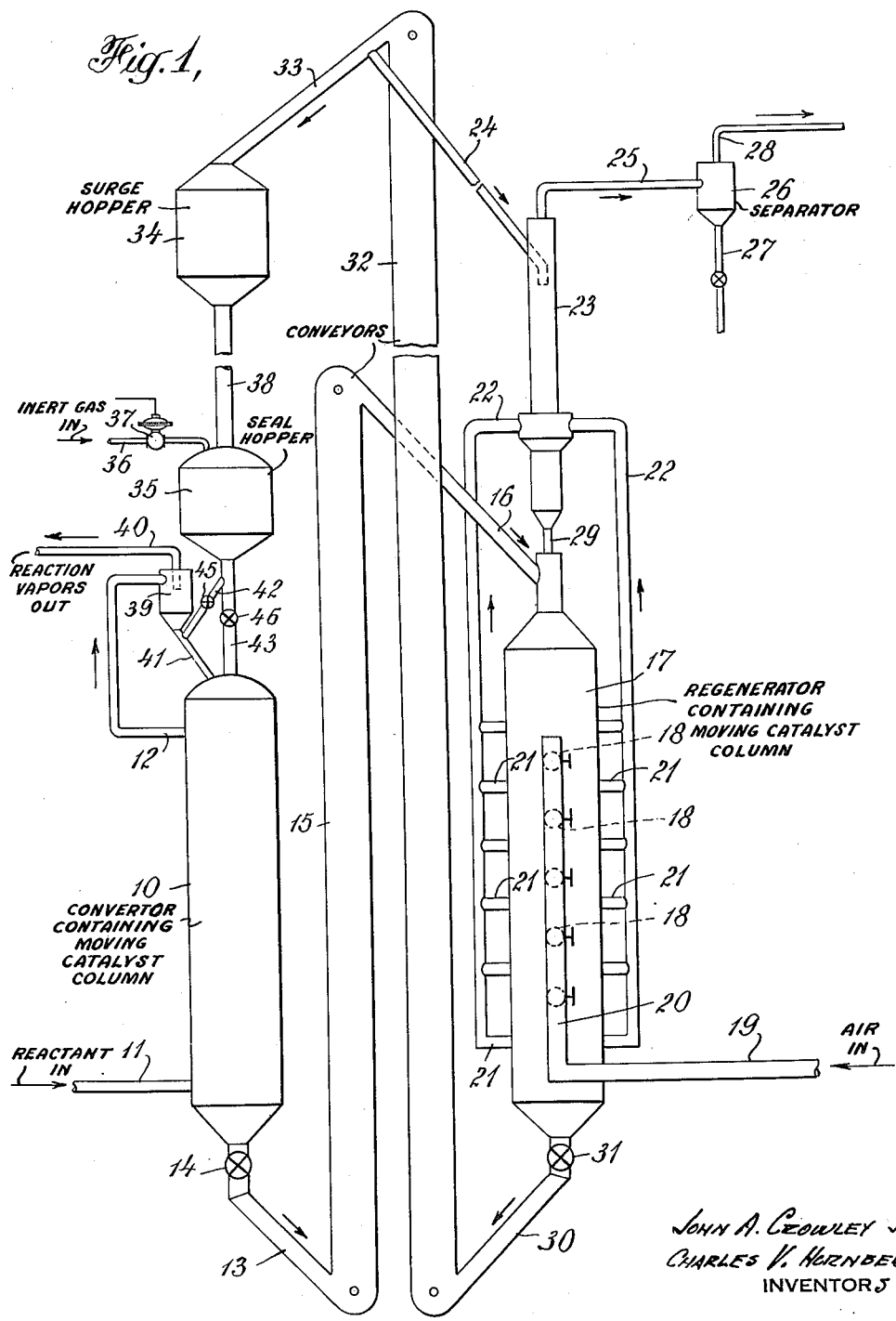

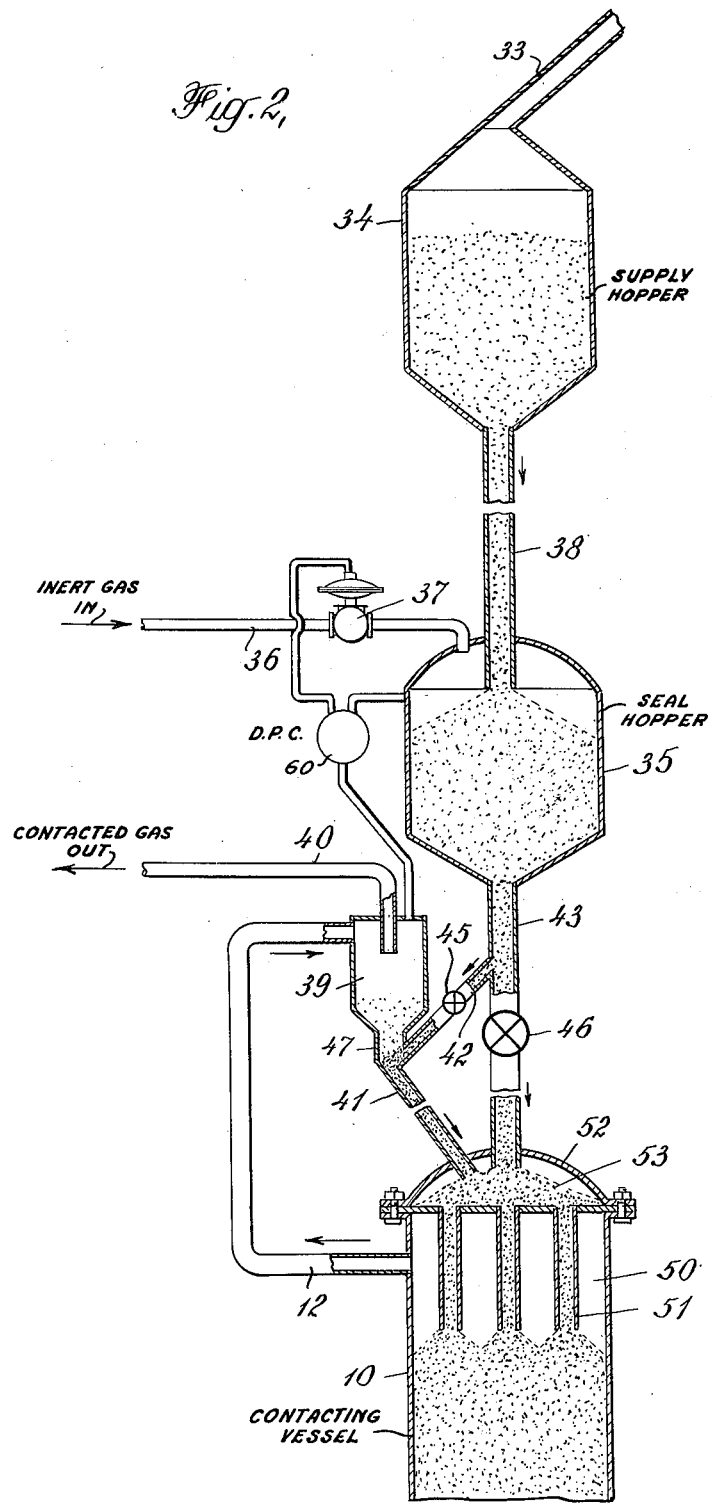

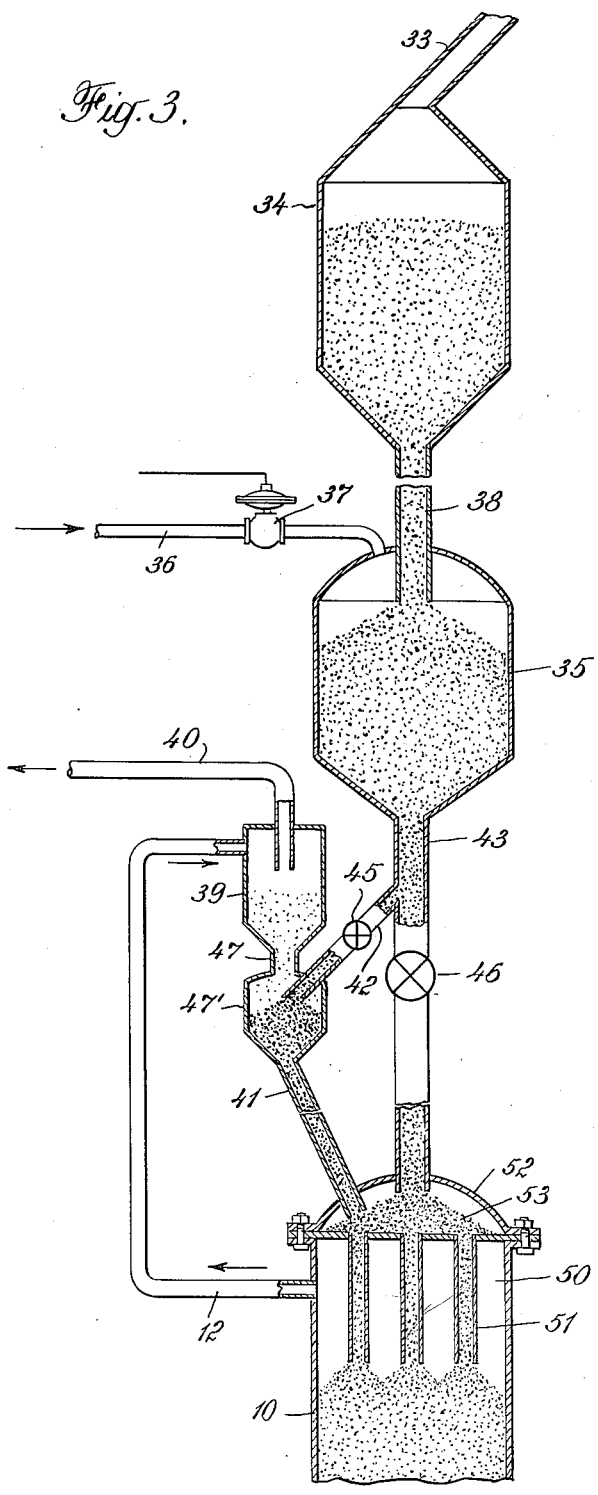

2,441,311

UNITED STATES PATENT OFFICE 2,441,311

METHOD AND APPARATUS FOR CONTACTING GASES AND PARTICLE FORM SOLID MATERIAL

John A. Crowley, Jr., Scarsdale, N. Y., and Charles V. Hornberg, Wenonah, N. J., assignors to Socony-Vacuum Oil Company, Incorporated, a corporation of New York Application October 14, 1944, Serial No. 558,694

13 Claims. (Cl. 196—52)

This invention has to do with processes wherein gases are contacted with particle form solid material for any of a number of purposes, such as gas adsorption, gas or solid treatment, solid regeneration, heat exchange or gaseous conversions. A typical and important example is the cracking conversion of hydrocarbons, it being well known that petroleum gas oils boiling in the range of 500° F. to 750° F., may be converted to gasoline and other products when subjected to contact with a particle form solid adsorbent material having catalytic properties at temperatures of the order of 800° F. to 950° F. and pressures usually above atmospheric. The solid adsorbent material may partake of the nature of natural clays and treated clays, such as fuller's earth, Superfiltrol and bauxite or of certain synthetic associations of alumina, silica or silica and alumina, any of which may contain added compounds such as certain metallic oxides. Recently this process has been developed as one wherein the particle form solid material is passed cyclically through two zones, in the first of which it is subjected to contact with hydrocarbon gases for the purpose of conversion and in the second of which it is subjected to the action of a combustion supporting gas, such as air, acting to burn off a contaminant material, deposited upon the solid material during the conversion step.

In such a cyclic process the solid material particles are subject to a gradual attrition resulting in the gradual accumulation in the circulating mass of solid material of small amounts of undersized solid material particles. In order to obtain satisfactory operation in such cyclic processes, it is necessary to maintain the solid material particle size within certain ranges which are dependent upon the particular apparatus and process involved. It is consequently desirable to prevent undue accumulation of undersized solid particles in the circulating solid material mass. Usually a certain amount of undersized, and in some operations normal sized solid material particles will be entrained from the conversion and the solid material regeneration vessels in the effluent gas streams therefrom. In the case particularly of the conversion vessel this is undesirable, because the solid material entrained therefrom will be entrained in the hydrocarbon gas stream and, consequently, said solid material will contain certain contaminant deposits. If this material is separated from the effluent gas and removed from the system, a subsequent difficult regeneration of the undersized material will be required before the undersized material may be reprocessed or used for other external purposes. Consequently, it is desirable to return such entrained solid material to the conversion vessel, and remove the accumulating undersized material from some other part of the cyclic system, preferably directly following the regeneration step. It will, of course, be apparent that if the solid material entrained from the convertor be partly or entirely of normal size, its return to the convertor is per se desirable. This invention has specifically to do with method and apparatus for accomplishing the return of such entrained material to conversion vessels.

It has been found that the return of such solid materials entrained from conversion vessels is complicated by two factors. First, if the entrained solid material is undersized and corresponding to a powder in form, it will tend to bridge and clog the drain conduit from the gas-solid separator. Second, in some operations the contaminant deposit may be sticky also causing the solid material to clog drain conduits especially if such conduits are relatively small in size. Such bridging or clogging of the separator drain conduits not only prevents the return of such material to the conversion vessel but may also result in the accumulation of solid material in the separator making its proper operation impossible. Another difficulty arises in that when a concentrated stream or mass of principally undersized solid material particles is returned to the conversion vessel, the effluent gas on contacting said concentrated mass of undersized material will tend to again entrain substantially all of it from the convertor.

A major object of this invention is the provision in a process wherein a gas is contacted with a moving particle form solid material, of a method and apparatus for return to the contacting vessel of solid material particles entrained from said contacting vessel in the effluent gas stream.

Another object of this invention is the provision in such a cyclic conversion system as hereinabove described of a method for returning entrained undersized contact mass material to a conversion vessel by gravity flow and in such a way as to substantially limit the immediate reentrainment thereof in the effluent gas stream from said conversion vessel.

These and other objects of the invention will appear in the following description of the drawings attached hereto of which Figure 1 is an elevational flow diagram of a cyclic conversion process and Figure 2 is an elevational view, partially in section showing the upper end of a conversion vessel and the application of the apparatus of this invention. Figure 3 is a similar view showing a modified form of the invention. All of these drawings are highly diagrammatic in form.

Before specific reference to the drawings, certain terms should be defined, which terms are repeatedly used both in describing and claiming the invention. The term undersized particle form solid material is intended to mean solid material of a particle size or of a range of particle sizes, the average of which is substantially less than the average particle size of the main stream of solid material cyclically passed through the particular system involved. The term gas or gaseous reactants, etc., is intended to cover material which is substantially in the gaseous phase at the operation conditions involved, regardless of what may be the normal phase of such material at atmospheric conditions.

Turning now to Figure 1, we find a conversion vessel 10 having a reactant gas inlet 11, and gaseous product outlet 12, a solid material outlet conduit 13 having a throttle valve 14 thereon. The outlet conduit 13 connects into a suitable conveyor 15 by which the spent solid material withdrawn from the convertor is conveyed upwardy to be discharged into conduit 16 feeding the regenerator vessel 17. The regenerator shown is of multistage type having several inlets 18 to which combustion supporting gas is introduced from the main inlet duct 19 and riser duct 20. Spent regeneration gas outlet ducts 21 are provided which connect into riser ducts 22. The spent regeneration gas passes from ducts 22 into and upwardly through an elutriator 23 wherein a relatively small stream of regenerated solid material introduced through conduit 24 is countercurrently scrubbed by at least part of the effluent regeneration gas for removal of undersized solid particles from the system. The undersized material is entrained in the effluent gas stream through outlet conduit 25 into a cyclone separator 26 wherein the gas-solid separation is accomplished, the separated undersized solid material being withdrawn through pipe 27 and the gas through pipe 28. Scrubbed normal size solid material particles pass from the elutriator through pipe 29 into the regenerator. The regenerator is provided with a drain conduit 30, having throttle valve 31 thereon through which regenerated solid material passes to the conveyor 32. It is then conveyed upwardly and discharged through conduit 33 into an accumulation hopper 34. A chamber 35 is positioned between the hopper 34 and convertor 10, and this chamber is provided with a conduit 36 having an instrument operated valve 37 thereon for admittance of an inert seal gas into the chamber 35. A substantially vertical conduit 38 extends between the hopper 34 and chamber 35, the conduit 38 being of sufficient vertical length to permit maintenance of a sufficient head of particle form solid material therein to permit gravity flow of the solid material into the chamber 35 against the gaseous pressure therein. A substantially vertical conduit 43 extends between the seal chamber 35 and the top of the convertor 10. A valve 46 is provided in conduit to permit control of the flow of solid material in the conduit to the convertor. A conduit 42 is connected between the conduit 43 and the upper section of a conduit 41 which in turn is connected between a cyclone separator 39 and the top of the convertor. A valve 45 is provided in conduit 42 to permit control of solid flow therethrough. The cyclone separator may be of any of a number of conventional types.

In operation solid material is cyclically passed downwardly through the convertor 10 and the regenerator 17, the flow from each of said vessels being throttled by means of throttle valves 14 and 31, respectively, so as to maintain substantially compact columns of said solid material in said vessels. A small side stream of regenerated solid material is passed through the elutriator 23 as hereinbefore described for the purpose of limiting the accumulation of excess quantities of undersized solid material in the cyclically flowing solid material stream. The range of solid material particle size in said cyclically flowing stream is to some extent dependent upon the type of conversion system involved. Thus for a system, such as shown, wherein the solid material flows through the vessel as substantially solid columns through which gases flow, a particle size range of 8 to 30 mesh has been found entirely satisfactory. In operations wherein relatively low gas throughput rates are involved, a particle size range of 60 to 100 mesh has been found acceptable. The undersized material which should be removed in the first example would be material substantially smaller than 30 mesh and especially material smaller than say 60 mesh.

Continuing a study of the operation of the system shown in Figure 1, reference should now also be made to Figure 2 wherein the upper end of the convertor is shown along with a somewhat modified form of the auxiliary solid material feed and gas withdrawal apparatus and wherein like numerals are used for like members. Reactant gases, such as vaporized hydrocarbons preheated to a suitable conversion temperature in a suitable external apparatus (not shown) pass into the convertor through conduit 11. The gas then passes through the column of solid material in the convertor, disengages therefrom in the zone 50 provided between pipes 51 in the upper end thereof and passes through outlet conduit 12 into a cyclone separator 39. In the separator substantially all or part of the solid material entrained from the convertor is separated from the gas. The gaseous reaction products are withdrawn through pipe 40 to a suitable product recovery system, not shown, and the separated solid material drops into the enlarged section 47 connected to the conical shaped bottom of the separator. This enlarged section may alternatively take the form of a separate chamber below the separator 39 and connected thereto by a suitable conduit or conduits. Such a chamber is shown at 47' in Figure 3, the remaining elements in Figure 3 being the same as in Figure 2. Such enlarged chambers permit better settling of the separated solid material from the separator 39 especially when the gaseous pressure in the separator is less than that in chambers 35 or 52. The enlarged section also permits better mixing of the separated and the normal sized feed solid material. A stream of normal sized feed material for the convertor passes into the enlarged section 47 through the conduit 42, thereby maintaining the section 47 and drain conduit 41 connected between said section and the top of the convertor substantially filled with solid material up to the level of the connection of conduit 42 into said section 47. The separated undersized material which is of substantially smaller total quantity than that flowing through conduit 42, drops from the cyclone separator 39 onto the stream of solid material flowing into conduit 41, mixes with the normal sized solid material and passes therewith through conduit 41 into the head chamber 52 of the convertor onto the bed of solid material 53 therein. All or only part of the normal sized particle form solid material feed may pass to the convertor through conduit 41 as described. If only part of the feed is introduced through conduit 42, the remainder may be passed from seal chamber 35 to the convertor by way of conduit 43, the relative flow in conduits 42 and 43 being adjusted by means of valves 45 and 46 therein respectively. Since the flow of solid material from the convertor is so throttled as to maintain the convertor substantially filled with solid material, the flow of solid material from conduit 41 will be throttled by the bed of solid material 53 in the convertor head section 52. Consequently, the conduit 41 will always be substantially filled with solid material which will act as a seal leg to prevent gas flow between the separator 39 and head section 52. An inert seal gas is introduced through pipe 36 into the seal chamber 35 and the rate of flow thereof is adjusted by instrument operated flow control valve 37 so that the gaseous pressure in chamber 35 is at least equal and preferably slightly greater, say ¼ to ½ pounds per square inch than the gaseous pressure in the separator 39 or in the head section 52 of the convertor. Thus, the escape into the atmosphere of combustible reactant gases is prevented. As has been shown hereinbefore regenerated particle form solid material is introduced into the seal chamber 35 from the surge hopper 34 by way of the gravity flow leg 38. If desired, other means may be used for introducing the solid material into chamber 35 against the gaseous pressure therein; such means may, for example, comprise star wheels, screw conveyors or systems of automatically operated lock chambers.

If the escape of a small amount of reactant gas is not objectionable, then, in such operations, the seal chamber 35 may be omitted and solid material feed may be all, or in part, conducted directly from the surge feed hopper 34 or from gravity feed conduit 38 into the enlarged section 47 below the separator. In less preferable arrangements enlarged section 47 may also be omitted and the normal sized solid material injected from conduit 42 into the lower end of the conical drain section of the separator 39. The cyclone separator shown may be replaced, if desired, by other suitable confined apparatus for solid-gas separation, but the use of the cyclone separator has been found preferable for such operations as hereinabove described.

By the method and apparatus hereinabove described, a stream of regenerated particle form solid material, free from cokey contaminant deposits and of an average particle size suitable for the operation involved is mixed with a stream of undersized contaminant bearing solid material particles which have been separated from an entraining gas stream, and the combined streams are passed through a conduit by gravity flow into a contacting or conversion vessel. The addition of the larger and contaminant free solid material particles to the stream of undersized contaminant bearing particles, effectively eliminates the clogging of the separator drain conduit by bridging of the undersized solid particles, thus making possible the return of such particles to the conversion vessel and preventing the accumulation thereof in the separator. Moreover, since the undersized material is thus introduced into the convertor intermixed with larger sized particles instead of as a concentrated stream of undersized particles, the tendency for disruption of the solid column flow through the conversion vessel due to gas flow therethrough and the tendency for the gas to re-entrain the undersized material is substantially reduced.

Whereas the apparatus of this invention has been found particularly useful in a process of the type described, it is not limited thereto. Such a method and apparatus for returning solid particles to a contacting or conversion vessel may also be used when the solid material flow within such vessels is not as a substantially compact column but as a rain of solid material or as solid material entirely or partially carried in a gas stream. When the apparatus is applied to such operations, the internal cross-section of the conduit 42 should be substantially greater than that of conduit 41 so as to avoid the possibility of the loss of a seal leg of solid material in the conduit 41.

The drawings hereto attached, the description thereof and the description of the application of this invention have been intended as exemplary and are not to be construed as limiting this invention except as it may be limited in the following claims.

We claim:

1. In a system for contacting gases with moving particle form solid material, a vessel adapted for contacting gases and solids therein and for passage of gases and particle form solids therethrough, means adapted for substantial separation of the entrained solid material particles from the effluent gas stream from said vessel, conduit means extending downwardly from said separation means to a location within said vessel, for return of said separated solid material to said contacting vessel, a chamber adapted to confine a bed of particle-form solid contact material under a gaseous pressure positioned above said separator, means to introduce particle form solid contact mass material feed for said contacting vessel into said chamber, means to maintain a suitable seal gas pressure in said chamber above the gaseous pressure in said separation means, means to deliver at least a part of the solid material feed from said chamber into said conduit extending from said separation means to said contacting vessel at a location adjacent its connection to said separation means.

2. In a system for conducting gaseous conversions in the presence of a particle form solid contact mass material, a vessel adapted for contact of a moving stream of gas with a moving stream of particle form contact mass material therein, a solid gas separation apparatus positioned above said vessel for separation of entrained undersized solid particles from the effluent gas from said vessel and means for directing said effluent gas through said separation apparatus, conduit means extending from said separation apparatus to a location within said vessel for return by gravity flow of separated solid material particles to said vessel, a solid feed supply chamber positioned above said separation apparatus, passage defining means extending between said chamber and a point adjacent the connection of said first named conduit with said separation apparatus for flow of a portion of the solid feed material into said first named conduit, said passage defining means being of greater cross-sectional area than said first named conduit, and conduit means extending downwardly from said supply chamber to said vessel for gravity flow of a portion of the solid feed material directly to said vessel.

3. In a system for conducting gaseous conversions in the presence of a particle form solid contact mass material, a vessel adapted for passage therethrough of a stream of gaseous reactants in contact with a moving stream of particle form solid contact mass material passing therethrough, a gas solid separation apparatus positioned above said vessel and means for directing effluent gas carrying entrained undersized contact mass material from said vessel through said separation apparatus, conduit means extending from said separation apparatus to said vessel for return by gravity flow of separated solid material to said vessel, means defining a chamber adapted to confine a bed of particle form solid contact mass material under a gaseous pressure, said chamber being positioned above said separation apparatus, means to introduce particle form solid contact mass material feed for said vessel to said chamber, passage defining means extending between said chamber and a point on said conduit adjacent its connection to said separation vessel for flow of at least part of said solid material feed into said conduit, said passage defining means being of greater internal cross-section than said conduit, means to maintain an inert gas pressure in said chamber above the gaseous pressure in said separation apparatus.

4. In a process wherein a particle form solid material is introduced into and passed through a confined contacting zone and wherein a contact gas is passed through said zone in contact with said solid material, then substantially disengaged therefrom and passed through a suitable separator for removal of entrained solid material particles, an improved method for returning said separated solid material to said contacting zone comprising introducing at least part of the solid material feed stream for said contacting zone into the stream of separated solid material passing from said separator close to the point where said stream of separated solid material passes from said separator and passing the mixed solid material as a confined compact stream to said contacting zone and maintaining the rate of introduction of said solid feed stream at said point where said stream of separated solid passes from said separator sufficiently high at all times to insure continuity of compactness all along the length of said mixed stream up to said point where the separated solid passes from said separator.

5. In a gaseous conversion system comprising a conversion vessel adapted for passage therethrough of a stream of gaseous reactants in contact with a stream of particle form solid contact mass material passing therethrough and a gas-solid separator for removal of entrained undersized particle form solid material from the effluent gas stream from said conversion vessel, the improved method for returning said separated undersized solid material to said conversion vessel consisting of maintaining a compact gravitating stream of mixed separated solid material and normal sized particle form solid material in a confined passage between said conversion vessel and a location close below said separator, causing said separated solid material to drop from said separator substantially directly onto the upper end of said stream of mixed solids at said location close below said separator, directing a gravitating confined, compact stream of normal sized particles into the upper end of said stream of mixed solids at a rate sufficient to continuously maintain said confined passage full and said stream of mixed solids compact up to said location close below said separator.

6. A method for conducting gaseous conversions in the presence of a moving particle form solid contact mass material comprising passing gaseous reactants through a confined conversion zone in contact with a particle form solid contact mass material passing through said zone, withdrawing gaseous conversion products from said conversion zone, substantially separating any entrained solid material from said effluent gas stream from said conversion zone in a suitable separation zone, maintaining a compact stream of mixed separated solid material and coarser solid material between said conversion zone and a point close below said separation zone thereabove, flowing mixed solids from the lower end of said stream into said conversion zone, causing the solid material separated in said separation zone to drain immediately into the upper end of said stream of mixed solids to partially replenish said stream of mixed solids, and directing a stream of the coarser feed solids which is larger than said stream of mixed solids onto the upper end of said stream of mixed solids to completely replenish said stream of mixed solids and to maintain the level of its upper end constant and close below said separation zone.

7. A method for conducting gaseous conversions in the presence of a particle form solid contact mass material consisting of the steps: passing gaseous reactant through a confined conversion zone in contact with a moving stream of particle form solid contact mass material passing therethrough, withdrawing gaseous conversion products from said conversion zone and passing said gaseous products along with any entrained undersized solid material through a suitable solid-gas separator, withdrawing the substantially solid-free gaseous products from said separator, returning the separated particle form solid material to said conversion zone in a confined gravity flowing stream; and at the same time maintaining at a location above said separator a confined bed of normal sized particle form solid contact mass material under an inert gaseous pressure somewhat greater than the gaseous pressure in said separator, continuously passing solid material from said confined bed as a substantially compact confined stream into said stream of returning undersized solid material so that the mixed solid material may pass together to said conversion zone as a substantially compact gravity flowing stream, and continuously replenishing said confined bed of solid material.

8. In a gas solid contact process a method for introducing two types of particle form solid material streams to a confined contacting zone, one stream consisting principally of particles of small average particle size and the other stream consisting principally of particles of relatively larger average particle size, which method comprises, introducing all of the stream of solid material of small average particle size and at least part of the stream of solid material of large average particle size into an enlarged chamber maintained above said contacting zone, passing the mixed solid material as a confined compact gravity flowing stream to said contacting zone, maintaining the rate of supply of the contact material of large particle size sufficiently high to provide a bed of contact material of substantially constant surface level in said enlarged chamber and passing any remaining portion of said stream of solid material of large average particle size as a separate, confined compact gravity flowing stream to said contacting zone.

9. In process for gaseous conversion in the presence of particle form solid materials of large and small particle size a method for continuously introducing the large and small particle size solid materials to the confined conversion zone which method comprises: mixing all of the solid feed material of small particle size with part of the solid feed material of large size in a confined chamber above said contacting zone, passing the mixed solid material as a substantially compact confined gravity flowing stream to said conversion zone, limiting the rate of supply of the large size feed material to said confined chamber only to that required to maintain a compact bed in said confined chamber and passing the remaining portion of the solid feed material of large size as a separate, substantially compact confined gravity flowing stream to said conversion zone.

10. In a system for contacting gases with moving particle form solid material, a vessel adapted for contacting of gases and solids therein, a substantially vertical solid feed conduit extending upwardly from said vessel, means to supply particle-form solid feed material to said conduit, means to withdraw solid material from the lower section of said vessel, separate means to introduce gaseous material into said vessel, a gas-solid separator positioned vertically above said vessel, an enlarged chamber directly below and close to said separator, conduit means for passage of effluent gas and entrained solid material from said vessel to said separator, conduit means for supply of normal sized solid material feed particles into said enlarged chamber, conduit means of smaller cross-sectional area than said enlarged chamber connected between said enlarged chamber and said vessel for downward flow of mixed separated and feed solid particles to said vessel.

11. In a process wherein a particle form solid material is introduced into and passed through a confined contacting zone and wherein a contact gas is passed through said zone in contact with said solid material, then substantially disengaged therefrom and passed through a suitable gas-solid separation zone for removal of entrained undersized solid material particles, an improved method for returning said separated undersized solid material to said contacting zone which comprises: causing said separated undersized solid material to drop directly from said separation zone onto a bed of solid material in a conterminous drain zone having a substantial cross-sectional area, introducing at least a portion of the feed stream of normal sized solid material particles into said drain zone to mix with said separated undersized solid material, limiting the rate of normal sized solid introduction onto said drain zone only to that required to maintain the surface level of said bed substantially constant and passing the mixed solid material as a substantially compact gravity flowing stream to said contacting zone.

12. A method for contacting fluids with particle form solid materials comprising the steps: passing particle form solid material through a confined contacting zone while contacting said solids with a stream of fluid material, withdrawing contacted gaseous material from said contacting zone and passing said gaseous material along with any entrained undersized solid material through a suitable solid-gas separation zone, withdrawing substantially solid-free gaseous material from said separation zone, returning the separated particle form solid material to said contacting zone in a confined gravity flowing stream, and at the same time maintaining at a location above said separation zone a confined bed of normal sized particle form solid feed material, passing solid feed material from said confined bed as a substantially compact confined stream into said stream of returning undersized solid material so that the mixed solid material may pass together to said conversion zone as a substantially compact gravity flowing stream of smaller cross-sectional size than said compact stream of solid feed material, permitting said compact stream of solid feed material to freely flow onto said compact stream of mixed solid material so as to maintain the latter continuously compact up to the level of the stream mixing, and replenishing said confined bed with normal sized feed solid material.

13. In a process wherein a fluid material is subjected to contact in a confined contacting zone with moving particle form solid material which is supplied to said zone as solid feed particles averaging substantially greater than 100 mesh Tyler screen in size and wherein contacted gaseous material is withdrawn from said zone carrying some entrained solid material averaging less than about 100 mesh Tyler screen in size, the improved method for returning said entrained solid material to said contacting zone comprising: passing said gaseous material and entrained solids from said contacting zone through a suitable solid-gas separation zone to effect separation of the entrained solids from said gaseous material, introducing at least part of the solid particle feed stream for said contacting zone into the stream of separated, smaller sized solid particles passing from said separation zone at a location close to that where said stream of separated solid material passes from said separation zone, passing the mixed solid material as a substantially compact, gravitating stream to said contacting zone, and limiting the rate of introduction of said feed stream into said stream of separated smaller sized particles only to that required to continuously maintain said stream of mixed solid material compact up to the level of the feed stream introduction as aforesaid.

JOHN A. CROWLEY, Jr.
CHARLES V. HORNBERG.

REFERENCES CITED

The following references are of record in the file of this patent:

UNITED STATES PATENTS

| Number | Name | Date |
|---|---|---|
| 1,446,778 | Witte | Feb. 27, 1923 |
| 2,296,722 | Marancik et al. | Sept. 22, 1942 |
| 2,302,209 | Goddin | Nov. 17, 1942 |
| 2,302,328 | Kelly | Nov. 17, 1942 |
| 2,325,611 | Keranen | Aug. 3, 1943 |
| 2,356,717 | Williams | Aug. 22, 1944 |
| 2,360,787 | Murphree et al. | Oct. 17, 1944 |
| 2,369,523 | Belchetz | Feb. 13, 1945 |
| 2,379,448 | Linn | July 3, 1945 |
| 2,384,356 | Tyson | Sept. 4, 1945 |
| 2,391,334 | Nicholson | Dec. 18, 1945 |
| 2,409,596 | Simpson et al. | Oct. 15, 1946 |